(12) United States Patent
Zhang et al.

(10) Patent No.: US 10,612,372 B2
(45) Date of Patent: Apr. 7, 2020

(54) AZIMUTHAL ACOUSTIC LOGGING WHILE DRILLING APPARATUS AND MEASUREMENT METHOD

(71) Applicant: Institute of Geology and Geophysics, Chinese Academy of Sciences, Beijing (CN)

(72) Inventors: Wenxiu Zhang, Beijing (CN); Qingyun Di, Beijing (CN); Wenxuan Chen, Beijing (CN); Jian Zheng, Beijing (CN); Yuntao Sun, Beijing (CN); Yongyou Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/541,472

(22) Filed: Aug. 15, 2019

(65) Prior Publication Data

US 2020/0072044 A1 Mar. 5, 2020

(30) Foreign Application Priority Data

Aug. 28, 2018 (CN) .......................... 2018 1 0990687

(51) Int. Cl.
*E21B 47/14* (2006.01)
*E21B 49/00* (2006.01)
*G01V 1/50* (2006.01)

(52) U.S. Cl.
CPC .............. *E21B 47/14* (2013.01); *E21B 49/00* (2013.01); *G01V 1/50* (2013.01)

(58) Field of Classification Search
CPC ........... G01V 1/50; E21B 47/14; E21B 49/00; E21B 47/16
See application file for complete search history.

(56) References Cited

U.S. PATENT DOCUMENTS

2004/0257911 A1\* 12/2004 Tang .................... G01V 1/44
367/81
2009/0012710 A1\* 1/2009 Van Os ................... E21B 47/04
702/6

(Continued)

FOREIGN PATENT DOCUMENTS

CN 103775067 A 5/2014
CN 106930758 A 7/2017

*Primary Examiner* — Sisay Yacob
(74) *Attorney, Agent, or Firm* — Novick, Kim & Lee, PLLC; Allen Xue (57) ABSTRACT

An azimuthal acoustic LWD apparatus is sequentially provided with a centralizer, a transmitting circuit, transmitting transducers, an acoustic insulator, a receiving transducer array, ultrasonic transducers and a receiving circuit on a drill collar. The azimuthal acoustic LWD apparatus is capable of operating in a dipole mode or a unipole mode, to cover all the sectors around a wellbore by adopting a fixed time interval measurement mode or an alternating time interval measurement mode according to a relationship of an interval between measurement times and a rotation speed of the apparatus, thereby achieving azimuthal acoustic LWD. This apparatus overcomes problems that the fixed time interval measurement mode may not cover all the sectors and further may not achieve azimuthal acoustic imaging in a case where the rotation speed and the interval between measurement times are under certain conditions.

18 Claims, 8 Drawing Sheets

(56) References Cited

U.S. PATENT DOCUMENTS

2009/0222209 A1* 9/2009 Morys .................. E21B 47/022
  702/9
2014/0301164 A1* 10/2014 Mandal .................. E21B 49/00
  367/35

\* cited by examiner

AZIMUTHAL ACOUSTIC LOGGING WHILE DRILLING APPARATUS AND MEASUREMENT METHOD

TECHNICAL FIELD

The present invention mainly belongs to the technical field of logging while drilling (LWD), and particularly relates to an azimuthal acoustic LWD apparatus and a measurement method.

BACKGROUND

Acoustic logging is one of the important measurement methods used to evaluate oil and gas reservoirs. For example, in rock mechanics analysis, acoustic data can provide pore pressure, rock strength, crustal stress orientation, and other information; and in petrophysical analysis, the acoustic data can be used to evaluate formation lithology and porosity. In recent years, an acoustic LWD technology is used to measure compressional wave and shear wave velocities while drilling, reduce the time taken by a well rig, improve the drilling efficiency, realize risk management in real time, and may meet needs of highly-deviated wells, horizontal wells and deep-water drilling. Accordingly, the acoustic LWD technology has been rapidly developed in oil and gas exploration and development.

An acoustic LWD instrument generally consists of an acoustic transmitting source, an acoustic receiver array and a acoustic insulator. When the instrument operates, the acoustic transmitting source periodically transmits acoustic pulses to the formation around the wellbore. An acoustic wave signal is received by the receiver array when the acoustic wave is propagating along the formation around the well, and the acoustic receiver array samples full-wave train signals to digitize the waveforms. The acoustic insulator is located between the acoustic transmitting source and the acoustic receiver array for attenuating direct wave signals propagating along a drill collar. The waveform data is processed, and a time difference of each component wave is calculated, the raw data is stored in a memory of a downhole instrument, and processing results of the time differences are transmitted to the ground through a mud pulse telemetry technology in real time. As a drilling continues, the above-mentioned acoustic signal measurement and data processing processes are repeated continuously, and the compressional wave and shear wave velocities of the formation at different depths are obtained.

The acoustic LWD technology has been undergoing the first generation of acoustic LWD instrument for measuring compressional waves and/or shear waves in fast formation by using a monopole source and the second generation of acoustic LWD instrument for measuring shear waves in slow formation by using a quadrupole source since it has been put into field in 1990s. However, these instruments may only provide single compressional and/or shear wave velocity information since a monopole measurement mode and a quadrupole measurement mode are both lack of azimuth characteristics, thereby being only suitable for logging applications in isotropic formations.

With an increasing demand for detailed evaluation of anisotropic complex reservoirs, the azimuthal acoustic LWD technology has received more and more attention in the industry in recent years. The technology usually adopts azimuthal acoustic source excitation, and utilizes rotation of the drill collar to obtain information about acoustic velocities in different directions in real time, for describing three-dimensional rock mechanical properties around the well.

The acoustic LWD instrument may have four operation modes according to different loading modes of the transmitting source: monopole, unipole, dipole and quadrupole, wherein the monopole mode and the quadrupole mode are difficulty applied in the azimuthal acoustic LWD instrument due to no azimuth characteristic or poorer azimuth characteristics caused by symmetrical loading.

The patent CN106930758A discloses an azimuthal acoustic LWD apparatus and method thereof, which adopts a quadrupole source transmission and multi-mode acquisition to determine anisotropic parameters of a formation by processing array signals. Since the quadrupole mode is insensitive to azimuth characteristics of the formation, the method may only determine a direction in which fast compressional waves are located and a size of an anisotropic value, and may not obtain information about velocity in different directions around the wellbore.

In addition, the above azimuthal acoustic LWD technology mainly involves a structure of a measurement apparatus and a data processing method, other than a azimuthal acoustic measurement method. The prior art generally adopts a fixed time interval measurement mode, that is, a transmitter transmits acoustic signals at fixed time intervals by programming, and a receiver records waveforms at the same time intervals, for example, measures them once per 100 ms. At the same time, a toolface angle of the instrument for each measurement is synchronously recorded (usually, an rotation angle of the instrument relative to a certain reference position), and measured data is assigned to different sectors according to the current value of the toolface angle, such an azimuthal coverage depends on the rotation speed and the measurement time interval of the instrument. When the measurement time interval has a specific relationship with the rotation speed of the instrument, for example, when the rotation speed is 1 revolution per second and the measurement time interval is 1 second, the instrument measures it only once in a fixed direction per revolution, may not cover positions around the entire wellbore, and may not achieve the azimuthal acoustic LWD. Accordingly, in view of deficiencies of the prior art, it is urgent to develop an effective azimuthal acoustic LWD apparatus and its associated measurement method.

SUMMARY

The present invention provides an azimuthal acoustic LWD apparatus and a measurement method. The azimuthal acoustic LWD apparatus is capable of operating in a dipole mode or a unipole mode. The measurement method is to cover all the sectors around a wellbore by adopting a fixed time interval measurement mode or an alternating time interval measurement mode according to a relationship of an measurement interval time and a rotation speed of the azimuthal acoustic LWD apparatus, and solve the technical problem that the fixed time interval measurement mode may not achieve azimuthal measurement when the measurement time interval has a specific relationship with the rotation speed of the instrument.

The present invention is achieved by the following technical solution.

An azimuthal acoustic LWD apparatus is sequentially provided with a centralizer, a transmitting circuit, transmitting transducers, a acoustic insulator, a receiving transducer array, ultrasonic transducers and a receiving circuit on a drill collar, wherein the receiving circuit includes an azimuth measurement module, the azimuth measurement module measures a magnetic toolface angle by adopting a dual-axis magnetic sensor, and the measured magnetic toolface angle is used to determine a current rotation angle of the azimuthal acoustic LWD apparatus; two axial directions of the dual-axis magnetic sensor are orthogonal to each other, one of which is in a radial direction of the azimuthal acoustic LWD apparatus, and is in the same straight line as the transmitting transducers, and the other axial direction is in a tangential direction of the azimuthal acoustic LWD apparatus; and a calculation method of the magnetic toolface angle is as follows:

$$\varphi = -\arctan\left(\frac{B_y}{B_x}\right),$$

wherein B represents a measured value of the magnetic sensor in the tangential direction, and $B_x$ represents a measured value of the magnetic sensor in the radial direction.

The receiving circuit processes time series data measured in an axial direction of the dual-axis magnetic sensor by using a Fast Fourier Transform (FFT), and extracts frequency information for obtaining a rotation speed of the azimuthal acoustic LWD apparatus; and the ultrasonic transducers are configured to measure a wellbore diameter, and the measured result is used to determine a current position of the azimuthal acoustic LWD apparatus in a wellbore in combination with the magnetic toolface angle measured by the azimuth measurement module, and further realize eccentricity correction and quality control of measured data for azimuthal acoustic LWD.

Further, there are two transmitting transducers, which are oppositely installed at 180 degrees apart around the drill collar, and the transmitting transducers are capable of operating in a dipole mode or a unipole mode;

the receiving transducer array includes a plurality of sets of receiving transducers arranged at equal intervals in an axial direction of the drill collar, each set of receiving transducers includes two receiving transducers that are oppositely installed at 180 degrees apart around the drill collar; the receiving transducers in the receiving transducer array are in a straight line along the axial direction of the drill collar as the transmitting transducers; and there are three ultrasonic transducers, which are installed at 120 degrees apart around the drill collar, wherein one ultrasonic transducer is in the same straight line along the axial direction of the drill collar as the transmitting transducers and the receiving transducers. Arranging the ultrasonic transducers in the same straight line along the axial direction of the drill collar can ensure that toolface angles of the transmitting transducers, the receiving transducers and the ultrasonic transducers relative to the apparatus are the same, in order to determine positions of the transmitting transducers and the receiving transducers in the wellbore.

Further, the transmitting circuit is installed on the wall of the drill collar in a grooving manner and arranged apart from the transmitting transducers along the axial direction of the drill collar, so that a propagation path of acoustic waves between the transmitting transducers and the receiving transducer array does not pass through a transmitting circuit installation structure, which prevents the transmitting circuit installation structure from affecting a acoustic field and avoids causing signal distortion.

Further, the transmitting circuit is respectively connected with the two transmitting transducers, and the transmitting circuit generates two high-voltage pulse signals, and the voltage is adjustable within a range of 200V to 2000V for exciting the transmitting transducers; the transmitting transducers have an operating frequency range of 2 kHz to 15 kHz, so that the azimuthal acoustic LWD apparatus is capable of operating in a low-frequency dipole mode and a high-frequency unipole mode.

Further, the receiving transducer array includes 6 or 8 sets of receiving transducers arranged at equal intervals along the axial direction of the drill collar; arranging the plurality of sets of receiving transducers at equal intervals aims at processing a time difference of compressional waves and shear waves by adopting a multi-channel correlation processing algorithm.

In the receiving transducer array, the receiving transducers closest to the transmitting transducers are the first set of receiving transducers, and a distance between the first set of receiving transducers and the transmitting transducers is called a source spacing, and the source spacing is 2 m to 4 m; and In the receiving transducer array, a distance between two adjacent sets of receiving transducers in the axial direction is called a spacing, and the spacing is 15 cm to 30 cm. The spacing cannot be too large, to avoid spatial aliasing and attenuation; and it cannot be too small, otherwise, it will affect a multi-channel correlation detection algorithm.

Further, the receiving circuit is respectively connected with the receiving transducer array and the ultrasonic transducers; the receiving circuit is configured to synchronously sample acoustic signals picked up by the plurality of sets of receiving transducers, and obtain compressional and shear wave velocities by the multi-channel correlation processing algorithm; and the receiving circuit is capable of exciting the three ultrasonic transducers simultaneously and measuring echo signals to calculate the wellbore diameter.

Further, the receiving circuit is installed on the wall of the drill collar in a grooving manner and arranged apart from the receiving transducer array in the axial direction of the drill collar, so that a propagation path of acoustic waves between the transmitting transducers and the receiving transducer array does not pass through a receiving circuit installation structure, which prevents the receiving circuit installation structure from affecting a acoustic field and avoids causing signal distortion.

There is provided a measurement method for azimuth LWD, wherein when an azimuthal acoustic LWD apparatus operates in a unipole measurement mode or a dipole measurement mode, the azimuthal acoustic LWD apparatus rotates with a drill tool, to cover all the sectors around a wellbore by adopting a fixed time interval measurement mode or an alternating time interval measurement mode according to a relationship of a measurement time interval and a rotation speed of an azimuthal acoustic LWD apparatus, thereby achieving azimuthal acoustic LWD;

in particular, when m≥1 and P≥n; or when m<1 and $P_0$≥n, if the fixed time interval measurement mode is adopted, the collected data can cover all the sectors around the wellbore;

when m≥1 and P<n; or when m<1 and $P_0$<n, if the fixed time interval measurement mode is adopted, the collected data cannot cover all the sectors around the wellbore, accordingly, if the alternating time interval measurement mode is adopted, the collected data can cover all the sectors around the wellbore;

wherein m represents the number of measurements when the azimuthal acoustic LWD apparatus completes one revolution, $$m = \frac{T}{t} = \frac{60}{R \times t},$$

T represents time taken by completing one revolution by the azimuthal acoustic LWD apparatus, t represents an interval time between two adjacent measurements, and R represents a rotation speed of the azimuthal acoustic LWD apparatus in revolutions per minute;

$$\text{let } m = \frac{P}{Q},$$

wherein P/Q represents an irreducible fraction, P and Q are relatively prime, meaning that the azimuthal acoustic LWD apparatus completes Q revolutions, and a total of P measurements are completed; and n represents the number of all the sectors around the wellbore;

when m≥1, that is, P≥Q, the time T is greater than or equal to the interval t, and at least one measurement is performed for every revolution, and the measured azimuth interval is 360°/P; data starts to repeat after P measurements (within Q revolutions); and when m<1, that is, P<Q, the time T is less than the interval t, let $e=1/m=Q/P=N+Q_0/P_0$, wherein N represents an integer part, which is a non-zero natural number, $Q_0/P_0$ is an irreducible fraction, $Q_0<P_0$, which is equivalent to a case where there is no measured data when the apparatus completes N revolutions, and then data is measured for $P_0$ times after $Q_0$ revolutions.

Further, the alternating time interval measurement mode includes two measurement processes, in particular, firstly, a first measurement is performed at a first interval t, the measurement times are $T_m$; a second measurement is performed at a second interval $t_1$, and the measurement times are also $T_m$; and one azimuth measurement is completed within $2T_m$;

wherein the second interval $t_1$ is determined according to the first interval t; and the measurement times $T_m$ are determined according to the first interval t, the second interval $t_1$, and the time $t_2$ required for one measurement from the start of transmitting to the end of receiving.

Further, a method for determining the first interval t is as follows: the first interval t is selected according to impulse discharge characteristics of an acoustic transducer exciting circuit and an average power of the circuit, wherein t is greater than 0.1s.

Further, when m≥1, that is, P≥Q, and P<n, a method for determining the second interval $t_1$ according to the first interval t is as follows:

in a second measurement process, the number $m_1$ of measurements when the azimuthal acoustic LWD apparatus completes one revolution is as follows:

$$m_1 = \frac{P_1}{Q_1} = \frac{60}{R \times t_1},$$

wherein $P_1/Q_1$ is an irreducible fraction, $P_1$ and $Q_1$ are relatively prime, meaning that in the second measurement process, the azimuthal acoustic LWD apparatus completes $Q_1$ revolutions, and a total of $P_1$ measurements are completed;

according to $$m = \frac{P}{Q} = \frac{60}{R \times t},$$

it is derived that:

$$\frac{P_1}{Q_1} = \frac{t}{t_1} \times \frac{P}{Q},$$

let $P_1/Q_1>1$, $P_1>n$, so that the second measurement meets a requirement of covering all the sectors around the wellbore; because values of the first interval t and the P/Q in the first measurement are known, the obtained second interval $t_1$ meets the following condition:

$$t1 < t \times \frac{P}{Q},$$

and meets a requirement that $P_1$ and $Q_1$ are relatively prime, wherein $P_1>n$;

when m<1, that is, P<Q, and $P_0<n$, a method for determining the second interval $t_1$ according to the first interval t is as follows:

when m<1, that is, when P<Q, $e=1/m=Q/P=N+Q_0/P_0$, a case where there is no measured data when the azimuthal acoustic LWD apparatus completes N revolutions is ignored, which may be converted into the following form:

$$m_0 = \frac{P_0}{Q_0},$$

wherein $Q_0<P_0$;

in the second measurement process, the number $m_1$ of measurements when the azimuthal acoustic LWD apparatus completes one revolution is as follows:

$$m_1 = \frac{P_1}{Q_1} = \frac{60}{R \times t_1},$$

wherein $P_1/Q_1$ represents an irreducible fraction, $P_1$ and $Q_1$ are relatively prime, meaning that in the second measurement process, the azimuthal acoustic LWD apparatus completes $Q_1$ revolutions, and a total of $P_1$ measurements are completed;

according to $$m_0 = \frac{P_0}{Q_0} = \frac{60}{R \times t},$$

it is derived that:

$$\frac{P_1}{Q_1} = \frac{t}{t_1} \times \frac{P_0}{Q_0},$$

let $P_1/Q_1>1$, $P_1>n$; because values of the first interval t and the $P_0/Q_0$ in the first measurement are known, the obtained second interval $t_1$ meets the following condition:

$$t_1 < t \times \frac{P_0}{Q_0},$$

and meets a requirement that $P_1$ and $Q_1$ are relatively prime, wherein $P_1 > n$.

Further, a method for determining the time $t_2$ required for one measurement from the start of transmitting to the end of receiving is as follows: the time $t_2$ is determined according to a measured source spacing and a range of wave velocities measured by the azimuthal acoustic LWD apparatus, $$t_2 \geq \frac{L_{max}}{V_{min}}$$

wherein $L_{max}$ represents a distance between the transmitting transducers and the farthest receiving transducer array, and $V_{min}$ represents a minimal acoustic wave velocity which can be measured by the azimuthal acoustic LWD apparatus.

Further, in order to ensure that n sectors have no vacant points throughout a sampling process, the measurement times $T_m$ must meet:

$$T_m \geq \frac{(t - 2 \times t_2) \times t}{(t_1 - t)}.$$

Further, the number n of all the sectors around the wellbore is 8, 16, or 32.

The present invention has advantageous technical effects:

(1) the azimuthal acoustic LWD apparatus provided by the present invention takes both a dipole measurement mode and a unipole measurement mode with good azimuth characteristics into account;

(2) in the azimuthal acoustic LWD apparatus provided by the present invention, a transmitting circuit and transmitting transducers, a receiving circuit and a receiving transducer array are arranged apart along an axial direction of a drill collar, so that a propagation path of acoustic waves between the transmitting transducers and receiving transducers is uniform in structure, which prevents a circuit installation structure from affecting acoustic field radiation and propagation, and aids the improvement in the quality of acoustic data;

(3) in view of the azimuthal acoustic LWD apparatus with a dipole mode and a unipole mode simultaneously, which is provided by the present invention, an azimuth measurement module composed of a dual-axis magnetic sensor and a wellbore diameter measurement module composed of three ultrasonic transducers are provided, for recording toolface information of an instrument, obtaining a position of the instrument in a wellbore, and correcting the eccentricity of the instrument; and measuring a toolface and a borehole diameter facilitates achieving of fine processing of azimuthal acoustic data; and (4) the present invention provides a measurement method for azimuthal acoustic LWD, which, according to a relationship of the measurement interval time and a rotation speed of the azimuthal acoustic LWD apparatus, by adopting a fixed time interval measurement mode or an alternating time interval measurement mode, overcomes problems that all the sectors may not be covered and further azimuthal acoustic LWD may not be achieved in a case where a rotation speed and an measurement time interval between are in certain conditions.

REFERENCE NUMERALS 1. centralizer; 2. transmitting circuit; 3. transmitting transducers; 4. acoustic insulator; 5. receiving transducer array; 6. ultrasonic transducers; 7. receiving circuit; 8. mud channel; and 9. drill collar.

DETAILED DESCRIPTION

In order to make objectives, technical solutions and advantages of the present invention be clearer, the present invention will be further described in detail below in conjunction with accompanying drawings and embodiments. It should be understood that the specific embodiments described herein are merely illustrative of the present invention and are not intended to limit the present invention.

Rather, the present invention encompasses any alternatives, modifications, and equivalent methods and solutions of the present invention as defined by appended claims and made within the spirit and scope of the present invention. Further, in order to provide the public with a better understanding of the present invention, some specific details are described in detail in the following detailed description of the present invention. The present invention may be fully understood by those skilled in the art without a description of these details.

Figure 1:
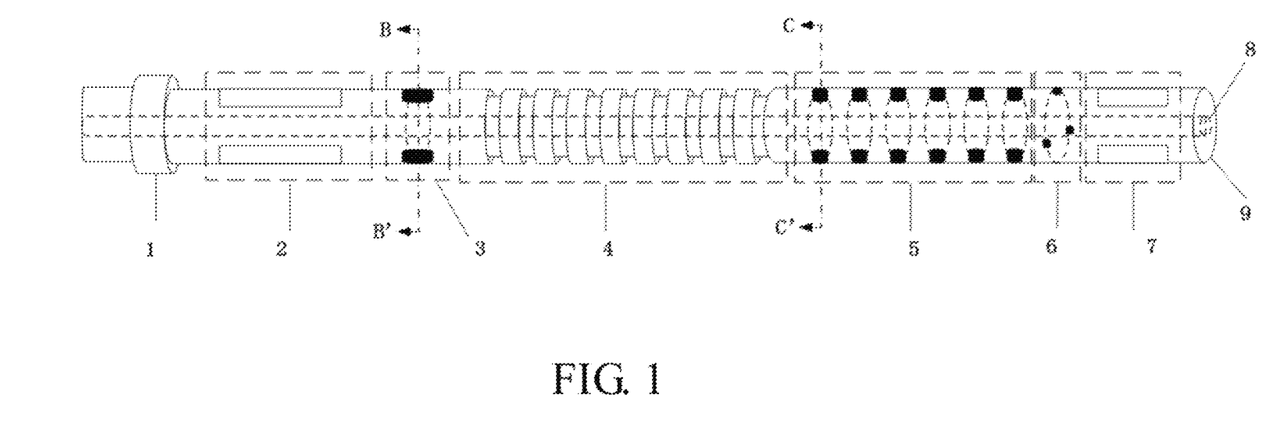
FIG. 1 is a schematic diagram showing a structure of an azimuthal acoustic LWD apparatus according to an embodiment of the present invention.

The embodiments of the present invention provide an azimuthal acoustic LWD apparatus. As shown in FIG. 1, a centralizer 1, a transmitting circuit 2, transmitting transducers 3, a acoustic insulator 4, a receiving transducer array 5, ultrasonic transducers 6 and a receiving circuit 7 are sequentially disposed on the drill collar 9, wherein the acoustic insulator 4 is located between the transmitting transducers 3 and the receiving transducer array 5 for attenuating direct waves propagating along the drill collar. The centralizer of the azimuthal acoustic LWD apparatus is disposed on one side of a transmitting acoustic source. In this embodiment, all of the above components are installed on one drill collar, and a cylindrical mud channel 8 is disposed in the middle of the drill collar.

Figure 2:
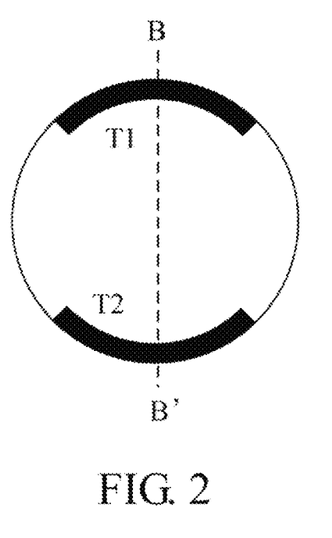
FIG. 2 is a schematic diagram of installation of transmitting transducers in an azimuthal acoustic LWD apparatus according to an embodiment of the present invention.
Figure 3:
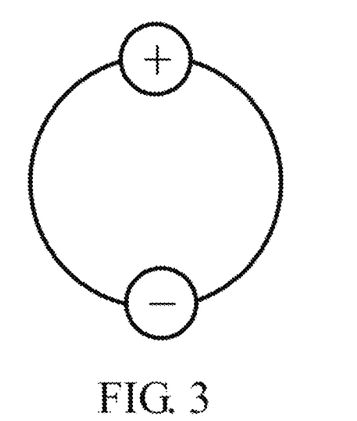
FIG. 3 is a schematic diagram showing a dipole mode of transmitting transducers in an azimuthal acoustic LWD apparatus according to an embodiment of the present invention.
Figure 4:
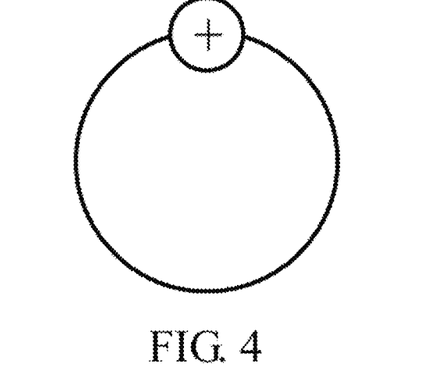
FIG. 4 is a schematic diagram showing a unipole mode of transmitting transducers in an azimuthal acoustic LWD apparatus according to an embodiment of the present invention.

In a specific implementation of the embodiment, there are two transmitting transducers, and as shown in FIG. 2, the two transmitting transducers (T1 and T2) are oppositely installed at 180 degrees apart around the drill collar. The transmitting transducers convert high-voltage electrical signals generated by the transmitting circuit into acoustic wave signals, and transmit them in a direction vertical to the wall of a wellbore to a formation. The transmitting transducers is capable of operating in a dipole mode or a unipole mode; two transducers are simultaneously used in the dipole mode (as shown in FIG. 3), and polarities of the pulse excitation signals applied by the two transducers are opposite. A single transmit transducer is used when operating in the unipole mode (as shown in FIG. 4).

In the embodiment of the present invention, the transmitting circuit is respectively connected with the two transmitting transducers, and the transmitting circuit generates two high-voltage pulse signals, and a voltage is adjustable within a range of 200V to 2000V for exciting the transmitting transducers; and the transmitting transducers have an operating frequency range of 2 kHz to 15 kHz. The transmitting circuit is installed on the wall of the drill collar in a grooving manner and arranged apart from the transmitting transducers in the axial direction of the drill collar, so that a propagation path of acoustic waves between the transmitting transducers and the receiving transducer array does not pass through a transmitting circuit installation structure, which prevents the transmitting circuit installation structure from affecting a radiated acoustic field and avoids causing signal distortion.

Figure 5:
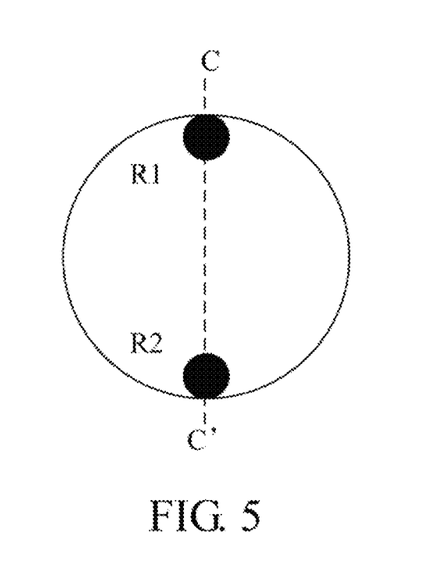
FIG. 5 is a schematic diagram of installation of receiving transducers in an azimuthal acoustic LWD apparatus according to an embodiment of the present invention.

The receiving transducer array includes a plurality of sets of receiving transducers arranged at equal intervals in the axial direction of the drill collar, each set of receiving transducers includes two receiving transducers that are oppositely installed at 180 degrees apart around the drill collar (as shown in FIGS. 5, R1 and R2 are two receiving transducers that are oppositely installed at 180 degrees apart around the drill collar). Preferably, in a particular implementation of the present invention, the receiving transducer array includes 6 sets or 8 sets of receiving transducers arranged at equal intervals in the axial direction of the drill collar. The receiving transducers in the receiving transducer array are in a straight line along the axial direction of the drill collar as the transmitting transducers; and a direction of receiving the signals is vertical to the wall of the wellbore, for converting acoustic signals into electric signals. Arranging the plurality of sets of receiving transducers at equal intervals aims at processing a time difference of compressional waves and shear waves by adopting a multi-channel correlation processing algorithm, wherein the multi-channel correlation processing algorithm is a conventional technology in the art, and can be implemented by those skilled in the art, which will be omitted here. The present invention does not involve the improvement in the multi-channel correlation processing algorithm.

In the receiving transducer array, the receiving transducers closest to the transmitting transducers are the first set of receiving transducers, and a distance between the first set of receiving transducers and the transmitting transducers is called a source spacing, and the source spacing is 2 m to 4 m; the source spacing cannot be too short, otherwise, it is not conducive to separation of various waveforms; however, in view of the attenuation of acoustic waves in a slow formation, the source spacing cannot be too large.

In the receiving transducer array, a distance between two adjacent sets of receiving transducers in the axial direction is called a spacing, and the spacing is 15 cm to 30 cm. The spacing cannot be too large, to avoid spatial aliasing and attenuation; and the spacing cannot be too small, otherwise, it will affect the multi-channel correlation processing algorithm.

Figure 6:
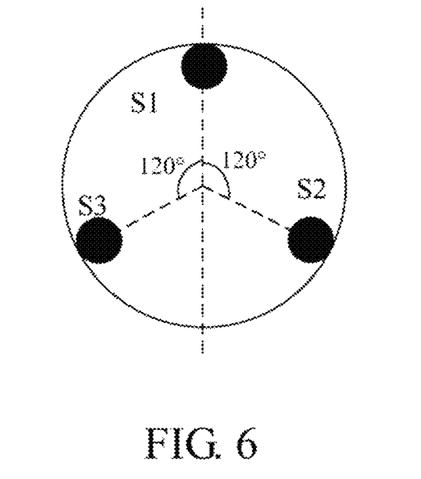
FIG. 6 is a schematic diagram of installation of ultrasonic transducers in an azimuthal acoustic LWD apparatus according to an embodiment of the present invention.

The ultrasonic transducers are configured to measure a borehole diameter, there are three ultrasonic transducers, which are installed at 120 degrees apart around the drill collar, wherein one ultrasonic transducer is in the same straight line along the axial direction of the drill collar as the transmitting transducers and the receiving transducers (as shown in FIG. 6, S1, S2 and S2 are three ultrasonic transducers installed at 120 degrees apart around the drill collar).

The receiving circuit is respectively connected with the receiving transducer array and the ultrasonic transducers; the receiving circuit is configured to synchronously sample acoustic signals picked up by the plurality of sets of receiving transducers, and obtain compressional and shear wave velocities by a multi-channel correlation processing algorithm; and the receiving circuit is capable of exciting the three ultrasonic transducers simultaneously and measuring echo signals to calculate a measured result of the borehole diameter.

Figure 7:
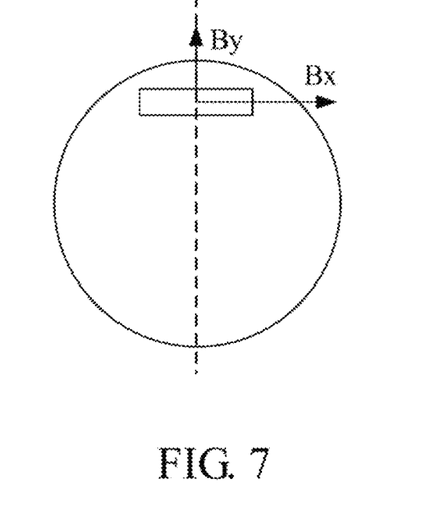
FIG. 7 is a schematic diagram of installation of a dual-axis magnetic sensor (azimuth measurement module) in an azimuthal acoustic LWD apparatus according to an embodiment of the present invention.

The receiving circuit includes a signal conditioning circuit, an analog-to-digital conversion circuit, a power supply, a processor, a memory, a control unit and an azimuth measurement module. The azimuth measurement module measures a magnetic toolface angle by adopting a dual-axis magnetic sensor; the measured magnetic toolface angle is used to determine a current rotation angle of the azimuthal acoustic LWD apparatus; as shown in FIG. 7, two axial directions of the dual-axis magnetic sensor are orthogonal to each other, one of which is in a radial direction of the azimuthal acoustic LWD apparatus, and is in the same straight line as the transmitting transducers, and the other axial direction is in a tangential direction of the azimuthal acoustic LWD apparatus, wherein the signal conditioning circuit, the analog-to-digital conversion circuit, the power supply, the processor, the memory and the control unit are all conventional technologies in the art, which can be fully implemented by those skilled in the art, and will be omitted here. The present invention does not involve the improvements in the signal conditioning circuit, the analog-to-digital conversion circuit, the power supply, the processor, the memory and the control unit.

The receiving circuit processes magnetic field time series data measured in an axial direction of the dual-axis magnetic sensor by using a Fast Fourier Transform, and extracts frequency information for obtaining a rotation speed of the azimuthal acoustic LWD apparatus.

The measured result of the borehole diameter of the receiving circuit is used to determine a current position of the azimuthal acoustic LWD apparatus in the wellbore in combination with the magnetic toolface angle measured by the azimuth measurement module, and further realize eccentricity correction and quality control of acoustic measured data.

The receiving circuit is installed on the wall of the drill collar and arranged apart from the receiving transducer array along the axial direction of the drill collar, so that a propagation path of acoustic waves between the transmitting transducers and the receiving transducer array does not pass through a receiving circuit installation structure, which prevents the receiving circuit installation structure from affecting a radiated acoustic field and avoids causing signal distortion.

Figure 8:
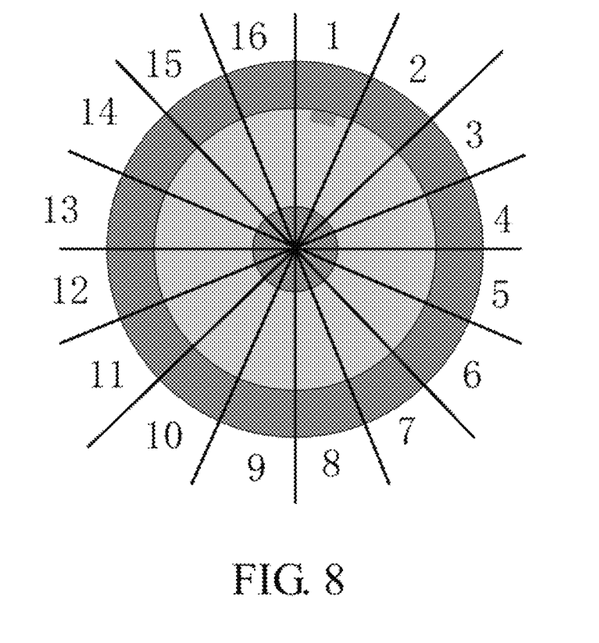
FIG. 8 is a schematic diagram of sector allocation of measured results for azimuthal acoustic LWD according to an embodiment of the present invention (taking 16 sectors as an example)

When the azimuthal acoustic LWD apparatus rotates with a drill tool, the apparatus operates in a unipole mode or a dipole mode, and transmits waveforms at a fixed time interval; the receiving circuit records the waveforms at the same time interval; meanwhile, an azimuth (i.e., the magnetic toolface angle) of each measurement is recorded; and data is respectively stored in n sectors (in this embodiment, by taking 16 sectors as an example, each sector has an angle of 22.5 degrees, in other alternatives, the number of sectors may be set according to the actual situation) according to a current toolface angle value. Data measured in each sector for multiple times is stacked, so that the signal-to-noise ratio is improved. Such an azimuth coverage depends on the rotation speed of the azimuthal acoustic LWD apparatus and the interval between measurement times. The number n of all the sectors around the wellbore is $2^k$, k is equal to 2, 3, 4, 5 or 6; preferably, k is equal to 3, 4, or 5, i.e. n is equal to 8, 16 or 32. FIG. 8 is a schematic diagram of sector allocation of measured results for azimuthal acoustic LWD (in this embodiment, taking 16 sectors as an example).

R represents a rotation speed of the azimuthal acoustic LWD apparatus in r/min, and t represents an interval time between two adjacent measurements in s, T represents time taken by completing one revolution by the azimuthal acoustic LWD apparatus (in s), $$T = \frac{60}{R} \quad (1)$$

m represents the number of measurements when the azimuthal acoustic LWD apparatus completes one revolution, $$m = \frac{T}{t} = \frac{60}{R \times t} \quad (2)$$

let $m = \frac{P}{Q}$,

P/Q represents an irreducible fraction (P and Q are relatively prime), meaning that the azimuthal acoustic LWD apparatus completes Q revolutions, and a total of P measurements are completed.

Figure 9:
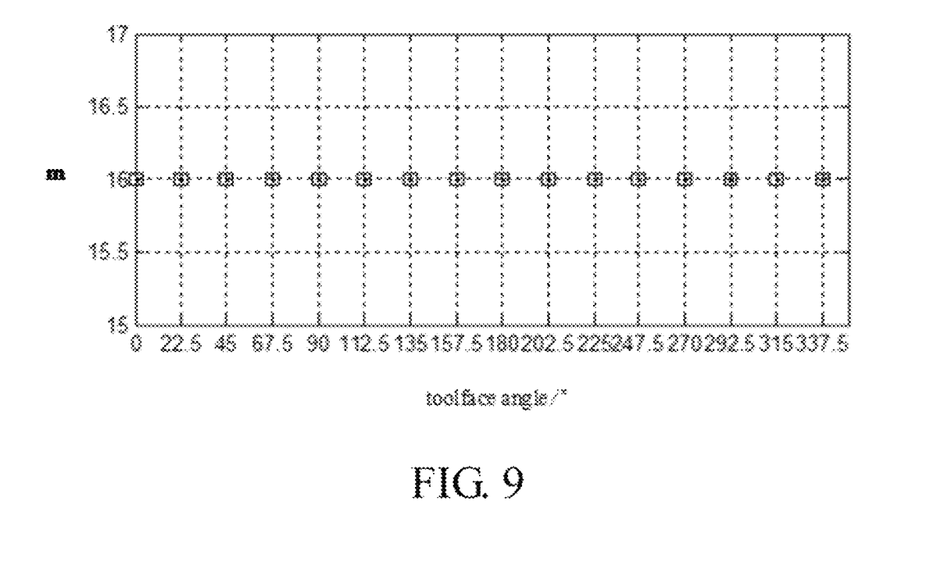
FIG. 9 is a sector coverage diagram of azimuth measurement data when $m \geq 1$ and $P \geq 16$ according to an embodiment of the present invention.
Figure 10:
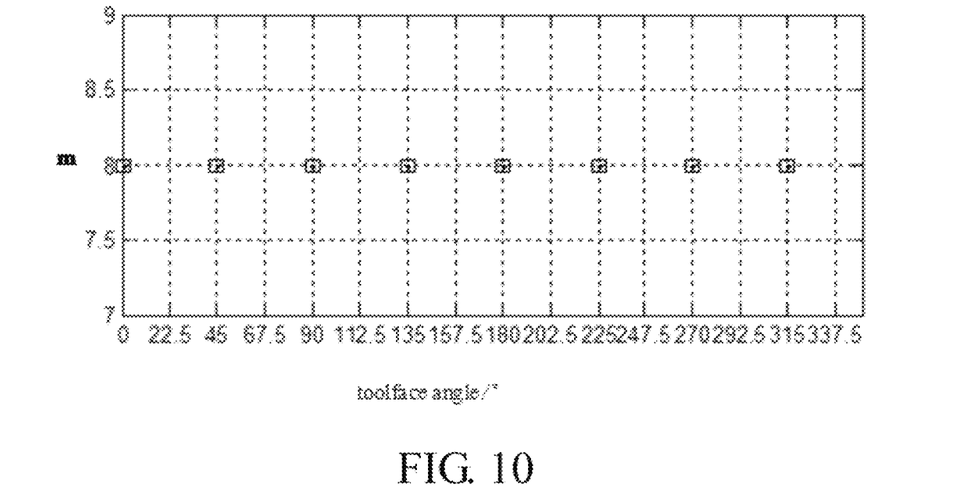
FIG. 10 is a sector coverage diagram of azimuth measurement data when $m \geq 1$ and $P < 16$ according to an embodiment of the present invention.

By taking 16 sectors as an example, there are two cases for discussion:

(1) when m≥1, that is, P≥Q, the time used by completing one revolution by the azimuthal acoustic LWD apparatus is greater than or equal to an interval t and at least one measurement is performed for every revolution, and the measured azimuth interval is 360°/P; and data starts to repeat after P measurements (within Q revolutions). Under such conditions, there are two cases for discussion:

1) when P≥16, each sector has at least one data coverage, and can achieve 16-sector azimuthal imaging. As shown in FIG. 9, when P=16, each sector has one measurement point;

2) when P<16, each sector cannot ensure one data coverage and may not achieve 16-sector azimuthal imaging. As shown in FIG. 10, when P=8, every two sectors have one measurement point;

when m<1, that is, P<Q, the time required by completing one revolution is less than the interval, each revolution may not ensure that there is one measurement point (there are measurement points every other revolutions). Let e=1/m=Q/P, meaning that within the interval t, the azimuthal acoustic LWD apparatus completes e revolutions.

Figure 11:
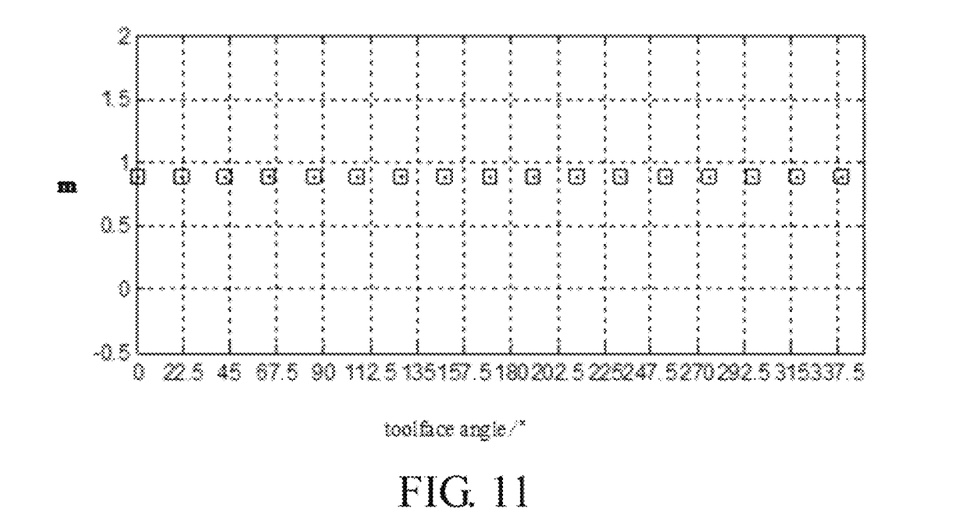
FIG. 11 is a sector coverage diagram of azimuth measurement data when $m < 1$ and $P_0 \geq 16$ according to an embodiment of the present invention.
Figure 12:
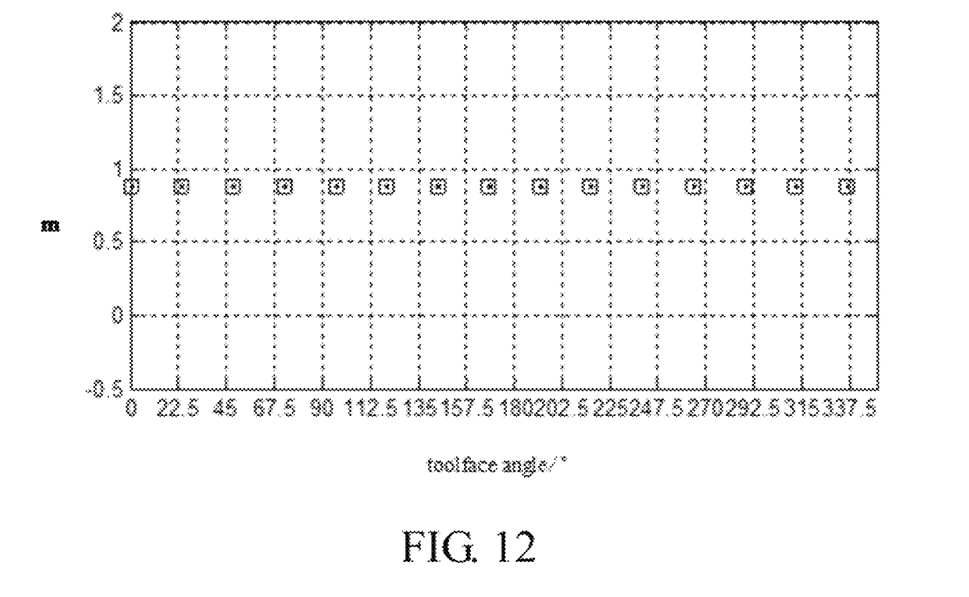
FIG. 12 is a sector coverage diagram of azimuth measurement data when $m < 1$ and $P_0 < 16$ according to an embodiment of the present invention.

Since Q/P is an improper fraction (the numerator is greater than the denominator), it is transformed into a mixed fraction form: $N+Q_0/P_0$, wherein N represents an integer part, which is a non-zero natural number, and $Q_0<P_0$ represents a proper fraction ($Q_0<P_0$), which is equivalent to a case where there is no measured data when the azimuthal acoustic LWD apparatus completes N revolutions, and the data is measured for $P_0$ times after $Q_0$ revolutions, and then repeated. When that the case where there is no measured data when the azimuthal acoustic LWD apparatus completes N revolutions is ignored, this is similar to a case of m≥1 discussed above. Under such conditions, there are two cases for discussion:

1) when $P_0 \geq 16$, each sector has at least one data coverage, and can achieve 16-sector azimuthal imaging. As shown in FIG. 11, when $P_0=17$, each sector has one measurement point;

2) when $P_0<16$, each sector cannot ensure one data coverage and may not achieve 16-sector azimuthal imaging. As shown in FIG. 12, when $P_0=15$, the 16th sector has no data;

It may be known from the above analysis, when there is a specific relationship of the interval between measurement times and the rotational speed of the azimuthal acoustic LWD apparatus, i.e., m≥1 and P<16, or m<1 and $P_0<16$, the fixed time interval measurement mode may not achieve azimuth measurement.

Figure 13:
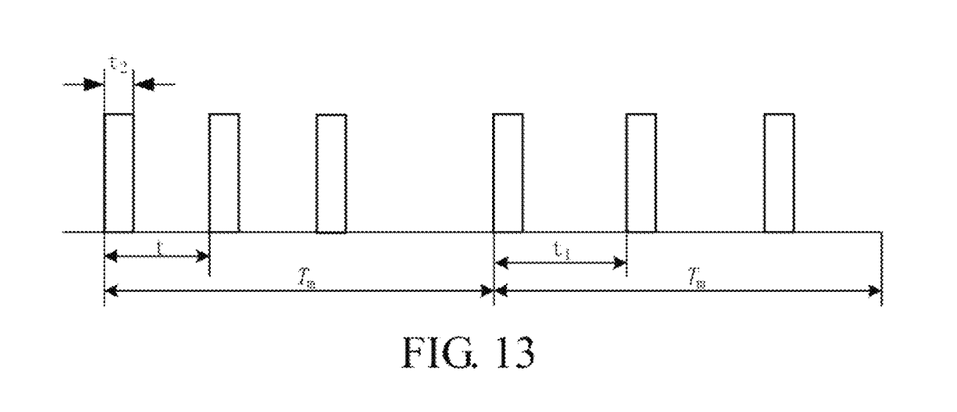
FIG. 13 is a schematic diagram showing an alternating time interval measurement mode according to an embodiment of the present invention.
Figure 14:
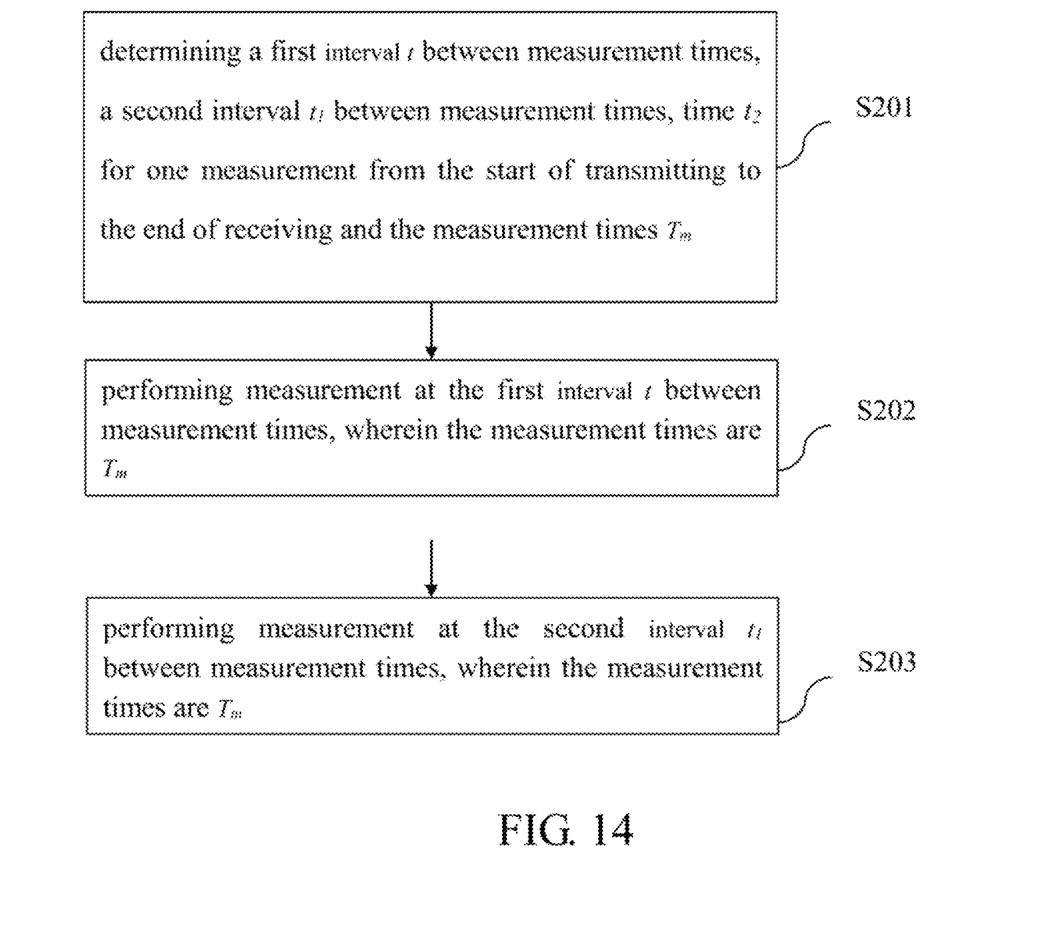
FIG. 14 is a flow diagram showing an alternating time interval measurement mode according to an embodiment of the present invention.

In view of the technical problem, embodiments of the present invention provide a measurement method for azimuth acoustic LWD. When an azimuthal acoustic LWD apparatus operates in a unipole mode or a dipole mode, the azimuthal acoustic LWD apparatus rotates with a drill tool, to cover all the sectors around a wellbore by adopting a fixed time interval measurement mode or an alternating time interval measurement mode according to a relationship of an interval between measurement times and a rotation speed of the azimuthal acoustic LWD apparatus, thereby achieving azimuthal acoustic LWD;

in particular, when m≥1 and P≥16; or when m<1 and $P_0$>16, if the fixed time interval measurement mode is adopted, the collected data can cover all the sectors around the wellbore;

when m≥1 and P<16; or when m<1 and $P_0$<16, if the fixed time interval measurement mode is adopted, the collected data cannot cover all the sectors around the wellbore, accordingly, if the alternating time interval measurement mode is adopted, the collected data can cover all the sectors around the wellbore;

the alternating time interval measurement mode includes two measurement processes, as shown in FIG. 13 and FIG. 14, in particular, firstly, a first measurement is performed at a first interval t, the measurement times are $T_m$; a second measurement is performed at a second interval $t_1$, and the measurement times are also $T_m$; and one azimuth measurement is completed within $2T_m$;

wherein the second interval $t_1$ is determined according to the first interval t; and the measurement times $T_m$ are determined according to the first interval t, the second interval $t_1$, and the time $t_2$ required for one measurement from the start of transmitting to the end of receiving;

a method for determining the first interval t is as follows: the first interval t is selected according to impulse discharge characteristics of an acoustic transducer excitation circuit and an average power of the circuit, wherein t is greater than 0.1s;

by taking n=16 as an example, a method for determining the second interval $t_1$ according to the first interval t includes two cases:

when m≥1, that is, P≥Q, and P<16, in a second measurement process, the number $m_1$ of measurements when the azimuthal acoustic LWD apparatus completes one revolution is:

$$m_1 = \frac{P_1}{Q_1} = \frac{60}{R \times t_1} \quad (3)$$

wherein $P_1/Q_1$ is an irreducible fraction, $P_1$ and $Q_1$ are relatively prime, meaning that in the second measurement process, the azimuthal acoustic LWD apparatus completes $Q_1$ revolutions, and a total of $P_1$ measurements are completed;

according to $$m = \frac{P}{Q} = \frac{60}{R \times t},$$

it is derived that:

$$\frac{P_1}{Q_1} = \frac{t}{t_1} \times \frac{P}{Q} \quad (4)$$

let $P_1/Q_1$>1, $P_1$>16, the second measurement meets a requirement of covering all the sectors around the wellbore; and because values of the first interval t and the P/Q in the first measurement are known, the obtained second interval $t_1$ meets the following condition:

t1<t×P/Q, and meets a requirement that $P_1$ and $Q_1$ are relatively prime, wherein $P_1$>16;

when m<1, that is, P<Q, and $P_0$<16, when m<1, that is, when P<Q, e=1/m=Q/P=N+$Q_0/P_0$, a case where there is no measured data when the azimuthal acoustic LWD apparatus completes N revolutions is ignored, which may be transformed into the following form:

$$m_0 = \frac{P_0}{Q_0}, \text{ wherein } Q_0 < P_0 \quad (5)$$

In the second measurement process, the number $m_1$ of measurements when the azimuthal acoustic LWD apparatus completes one revolution is:

$$m_1 = \frac{P_1}{Q_1} = \frac{60}{R \times t_1},$$

wherein $P_1/Q_1$ represents an irreducible fraction, $P_1$ and $Q_1$ are relatively prime, meaning that in the second measurement process, the azimuthal acoustic LWD apparatus completes $Q_1$ revolutions, and a total of $P_1$ measurements are completed;

according to $$m_0 = \frac{P_0}{Q_0} = \frac{60}{R \times t},$$

it is derived that:

$$\frac{P_1}{Q_1} = \frac{t}{t_1} \times \frac{P_0}{Q_0} \quad (6)$$

let $P_1/Q_1$>1, $P_1$>16; and because values of the first interval t and the $P_0/Q_0$ in the first measurement are known, the obtained second interval $t_1$ meets the following condition:

$$t1 < t \times \frac{P_0}{Q_0},$$

and meets a requirement that $P_1$ and $Q_1$ are relatively prime, wherein $P_1$>16.

A method for determining time $t_2$ required for one measurement from the start of transmitting to the end of receiving according to a measured source spacing and a range of wave velocities measured by of the azimuthal acoustic LWD apparatus is as follows:

$$t_2 \geq \frac{L_{max}}{V_{min}} \quad (7)$$

wherein $L_{max}$ represents a distance between the transmitting transducers and the farthest receiving transducer array, and $V_{min}$ represents a minimal wave velocities which can be measured by the azimuthal acoustic LWD apparatus.

A method for determining the measurement times $T_m$ according to the first interval t, the second interval $t_1$ and the time $t_2$ required for one measurement from the start of transmitting to the end of receiving is as follows:

the total measurement time of each azimuth measurement is $2*T_m$, and operation times of the first and second intervals between measurement times are both $T_m$, the time required for one measurement from the start of transmitting to the end of receiving is $t_2$, and the total number of measurements within $T_m$ is $$\frac{T_m}{t},$$

and in order to ensure that 16 sectors have no vacant points throughout a sampling process, it must meet:

$$\frac{T_m}{t} \times (t_1 - t) \geq t - 2 \times t_2 \qquad (8)$$

accordingly, $T_m$ must meet:

$$T_m \geq \frac{(t - 2 \times t_2) \times t}{(t_1 - t)} \qquad (9)$$

What is claimed is:

1. An azimuthal acoustic LWD apparatus, comprising a centralizer, a transmitting circuit, transmitting transducers, an acoustic insulator, a receiving transducer array, ultrasonic transducers and a receiving circuit sequentially disposed on a drill collar; wherein the receiving circuit comprises an azimuth measurement module, the azimuth measurement module measures a magnetic toolface angle by adopting a dual-axis magnetic sensor, and the measured magnetic toolface angle is used to determine a current rotation angle of the azimuthal acoustic LWD apparatus; two axial directions of the dual-axis magnetic sensor are orthogonal to each other, one of which is in a radial direction of the azimuthal acoustic LWD apparatus, and is in the same straight line as the transmitting transducers, and the other axial direction is in a tangential direction of the azimuthal acoustic LWD apparatus;

wherein the receiving circuit processes time series data measured in an axial direction of the dual-axis magnetic sensor by using a Fast Fourier Transform, and extracts frequency information for obtaining a rotation speed of the azimuthal acoustic LWD apparatus; and wherein the ultrasonic transducers are configured to measure a wellbore diameter, and a measured result of the wellbore diameter is used to determine a current position of the azimuthal acoustic LWD apparatus in a wellbore in combination with the magnetic toolface angle measured by the azimuth measurement module, and further realizes eccentricity correction and quality control of measured data.

2. The azimuthal acoustic LWD apparatus according to claim 1, wherein there are two transmitting transducers, which are oppositely installed at 180 degrees apart around the drill collar, and the transmitting transducers are capable of operating in a dipole mode or a unipole mode;

the receiving transducer array comprises a plurality of sets of receiving transducers arranged at equal intervals in an axial direction of the drill collar, each set of receiving transducers comprises two receiving transducers that are oppositely installed at 180 degrees apart around the drill collar;

the receiving transducers in the receiving transducer array are in a straight line along the axial direction of the drill collar as the transmitting transducers; and there are three ultrasonic transducers, which are installed at 120 degrees apart around the drill collar, wherein one ultrasonic transducer is in the same straight line along the axial direction of the drill collar as the transmitting transducers and the receiving transducers.

3. The azimuthal acoustic LWD apparatus according to claim 1, wherein the transmitting circuit is installed on the wall of the drill collar in a grooving manner and arranged apart from the transmitting transducers along the axial direction of the drill collar, so that a propagation path of acoustic waves between the transmitting transducers and the receiving transducer array does not pass through a transmitting circuit installation structure, which prevents the transmitting circuit installation structure from affecting a radiated acoustic field and avoids causing signal distortion.

4. The azimuthal acoustic LWD apparatus according to claim 2, wherein the receiving transducer array comprises 6 or 8 sets of receiving transducers arranged at equal intervals along the axial direction of the drill collar;

in the receiving transducer array, the receiving transducers closest to the transmitting transducers are the first set of receiving transducers, and a distance between the first set of receiving transducers and the transmitting transducers is called a source spacing, and the source spacing is 2 m to 4 m; and in the receiving transducer array, a distance between two adjacent sets of receiving transducers in the axial direction is called a spacing, and the spacing is 15 cm to 30 cm.

5. The azimuthal acoustic LWD apparatus according to claim 1, wherein the receiving circuit is respectively connected with the receiving transducer array and the ultrasonic transducers; the receiving circuit is configured to synchronously sample acoustic signals picked up by the plurality of sets of receiving transducers, and obtain compressional and shear wave velocities by a multi-channel correlation processing algorithm; and the receiving circuit is capable of exciting the three ultrasonic transducers simultaneously and measuring echo signals to calculate the wellbore diameter.

6. The azimuthal acoustic LWD apparatus according to claim 1, wherein the receiving circuit is installed on the wall of the drill collar in a grooving manner and arranged apart from the receiving transducer array in the axial direction of the drill collar, so that a propagation path of acoustic waves between the transmitting transducers and the receiving transducer array does not pass through a receiving circuit installation structure, which prevents the receiving circuit installation structure from affecting an acoustic field and avoids causing signal distortion.

7. A measurement method for azimuthal acoustic LWD, wherein, when an azimuthal acoustic LWD apparatus operates in a unipole measurement mode or a dipole measurement mode, the azimuthal acoustic LWD apparatus rotates with a drill tool, to cover all the sectors around a wellbore by adopting a fixed time interval measurement mode or an alternating time interval measurement mode according to a relationship of a measurement time interval and a rotation speed of the azimuthal acoustic LWD apparatus;

wherein,
when m≥1 and P≥n; or when m<1 and $P_0$≥n, and the fixed time interval measurement mode is adopted, the collected data cover all the sectors around the wellbore;
when m≥1 and P<n; or when m<1 and $P_0$<n, and the fixed time interval measurement mode is adopted, the collected data do not cover all the sectors around the wellbore, and, when the alternating time interval measurement mode is adopted, the collected data cover all the sectors around the wellbore;
wherein m represents the number of measurements when the azimuthal acoustic LWD apparatus completes one revolution, $$m = \frac{T}{t} = \frac{60}{R \times t},$$

T represents time taken by completing one revolution by the azimuthal acoustic LWD apparatus, t represents an interval time between two adjacent measurement, and R represents a rotation speed of the azimuthal acoustic LWD apparatus in revolutions per minute; let $$m = \frac{P}{Q},$$

wherein P/Q represents an irreducible fraction, P and Q are relatively prime, meaning that the azimuthal acoustic LWD apparatus completes Q revolutions, and a total of P measurements are completed; and n represents a number of all the sectors around the wellbore;
when m≥1, that is, P≥Q, the time T is greater than or equal to the interval t, and at least one measurement is performed for every revolution, and the measured azimuth interval is 360°/P;
data is measured for P times within Q revolutions; and
when m<1, that is, P<Q, the time T is less than the interval t, let e=1/m=Q/P=N+$Q_0$/$P_0$, wherein N represents an integer part, which is a non-zero natural number, $Q_0$<$P_0$ is an irreducible fraction, $Q_0$<$P_0$, which is equivalent to a case where there is no measured data when the apparatus completes N revolutions, and then data is measured for $P_0$ times after $Q_0$ revolutions.

8. The measurement method for azimuthal acoustic LWD according to claim 7, wherein the alternating time interval measurement mode comprises two measurement processes, firstly, a first measurement is performed at a first interval t, the measurement times are $T_m$; a second measurement is performed at a second interval $t_1$, and the measurement times are also $T_m$; and one azimuth measurement is completed within $2T_m$;
wherein the second interval $t_1$ is determined according to the first interval t; and the measurement times $T_m$ are determined according to the first interval t, the second interval $t_1$, and a time $t_2$ required for one measurement from the start of transmitting to the end of receiving.

9. The measurement method for azimuthal acoustic LWD according to claim 8, wherein a method for determining the first interval t is as follows: the first interval t is selected according to impulse discharge characteristics of an acoustic transducer exciting circuit and an average power of the circuit, wherein t is greater than 0.1s.

10. The measurement method for azimuthal acoustic LWD according to claim 8, wherein when m≥1, P≥Q, and P<n, a method for determining the second interval $t_1$ according to the first interval t is as follows:
in a second measurement process, the number $m_1$ of measurements when the azimuthal acoustic LWD apparatus completes one revolution is as follows:

$$m_1 = \frac{P_1}{Q_1} = \frac{60}{R \times t_1},$$

wherein $P_1/Q_1$ is an irreducible fraction, $P_1$ and $Q_1$ are relatively prime, meaning that in the second measurement process, the azimuthal acoustic LWD apparatus completes $Q_1$ revolutions, and a total of $P_1$ measurements are completed;
according to $$m = \frac{P}{Q} = \frac{60}{R \times t},$$

it is derived that:

$$\frac{P_1}{Q_1} = \frac{t}{t_1} \times \frac{P}{Q},$$

let $P_1/Q_1$>1, $P_1$>n, so that the second measurement meets a requirement of covering all the sectors around the wellbore; because the values of the first interval t and the P/Q in the first measurement are known, the obtained second interval $t_1$ meets the following condition:

$$t1 < t \times \frac{P}{Q},$$

and meets a requirement that $P_1$ and $Q_1$ are relatively prime, wherein $P_1$>n;
when m<1, that is, P<Q, and $P_0$<n, a method for determining the second interval $t_1$ according to the first interval t is as follows:
when m<1, that is, when P<Q, e=1/m=Q/P=N+$Q_0$/$P_0$, a case where there is no measured data when the azimuthal acoustic LWD apparatus completes N revolutions is ignored, which may be converted into the following form:

$$m_0 = \frac{P_0}{Q_0},$$

wherein $Q_0$<$P_0$;
in the second measurement process, the number $m_1$ of measurements when the azimuthal acoustic LWD apparatus completes one revolution is as follows:

$$m_1 = \frac{P_1}{Q_1} = \frac{60}{R \times t_1},$$

wherein $P_1/Q_1$ represents an irreducible fraction, $P_1$ and $Q_1$ are relatively prime, meaning that in the second measurement process, the azimuthal acoustic LWD apparatus completes $Q_1$ revolutions, and a total of $P_1$ measurements are completed;

according to $$m_0 = \frac{P_0}{Q_0} = \frac{60}{R \times t},$$

it is derived that:

$$\frac{P_1}{Q_1} = \frac{t}{t_1} \times \frac{P_0}{Q_0};$$

let $P_1/Q_1 > 1$, $P_1 > n$; because values of the first interval t and the $P_0/Q_0$ in the first measurement are known, the obtained second interval $t_1$ meets the following condition:

$$t1 < t \times \frac{P_0}{Q_0},$$

and meets a requirement that $P_1$ and $Q_1$ are relatively prime, wherein $P_1 > n$.

11. The measurement method for azimuthal acoustic LWD according to claim 8, wherein a method for determining the time $t_2$ required for one measurement from the start of transmitting to the end of receiving is as follows: the time $t_2$ is determined according to a measured source spacing and a range of wave velocities measured by the azimuthal acoustic LWD apparatus, $$t_2 \geq \frac{L_{max}}{V_{min}},$$

wherein $L_{max}$ represents a distance between the transmitting transducers and the farthest receiving transducer array, and $V_{min}$ represents a minimal acoustic wave velocities which can be measured by the azimuthal acoustic LWD apparatus.

12. The measurement method for azimuthal acoustic LWD according to claim 8, wherein in order to ensure that n sectors have no vacant points throughout a sampling process, the measurement times $T_m$ must meet:

$$T_m \geq \frac{(t - 2 \times t_2) \times t}{(t_1 - t)}.$$

13. The measurement method for azimuthal acoustic LWD according to claim 7, wherein the number n of all the sectors around the wellbore is 8, 16, or 32.

14. The measurement method for azimuthal acoustic LWD according to claim 8, wherein the number n of all the sectors around the wellbore is 8, 16, or 32.

15. The measurement method for azimuthal acoustic LWD according to claim 9, wherein the number n of all the sectors around the wellbore is 8, 16, or 32.

16. The measurement method for azimuthal acoustic LWD according to claim 10, wherein the number n of all the sectors around the wellbore is 8, 16, or 32.

17. The measurement method for azimuthal acoustic LWD according to claim 11, wherein the number n of all the sectors around the wellbore is 8, 16, or 32.

18. The measurement method for azimuthal acoustic LWD according to claim 12, wherein the number n of all the sectors around the wellbore is 8, 16, or 32.

* * * * *